United States Patent [19]
Asano et al.

[11] Patent Number: 6,062,594
[45] Date of Patent: May 16, 2000

[54] AIR BAG FOR PROTECTING PASSENGER FROM SIDE COLLISION WHICH HAS UNIFORM INFLATION CHARACTERISTICS

[75] Inventors: Masakazu Asano, Tokoname; Nobuhiko Sakamoto, Inazawa; Hiroyuki Kobayashi, Bisai, all of Japan

[73] Assignee: Toyoda Gosei Co., Ltd., Aichi, Japan

[21] Appl. No.: 09/031,707

[22] Filed: Feb. 27, 1998

[30] Foreign Application Priority Data

Feb. 27, 1997 [JP] Japan ................................ 9-043854
Jul. 7, 1997 [JP] Japan ................................ 9-180914

[51] Int. Cl.⁷ .......................... B60R 21/22; B60R 21/24; B60R 21/28
[52] U.S. Cl. .................... 280/730.2; 280/729; 280/742
[58] Field of Search ............. 280/730.2, 730.1, 280/729, 728.1, 742, 743.1

[56] References Cited

U.S. PATENT DOCUMENTS

| | | | |
|---|---|---|---|
| 5,570,900 | 11/1996 | Brown | 280/729 |
| 5,722,685 | 3/1998 | Eyrainer | 280/730.2 |
| 5,730,464 | 3/1998 | Hill | 280/743.2 |
| 5,791,685 | 8/1998 | Lachat et al. | 280/743.1 |
| 5,803,485 | 9/1998 | Acker et al. | 280/728.2 |

FOREIGN PATENT DOCUMENTS

| | | | |
|---|---|---|---|
| 227348 | 2/1993 | Japan | 280/730.2 |
| 07117610A | 5/1995 | Japan . | |
| 08156668A | 6/1996 | Japan . | |

*Primary Examiner*—J. J. Swann
*Assistant Examiner*—F. Zeender
*Attorney, Agent, or Firm*—Pillsbury Madison & Sutro, LLP

[57] ABSTRACT

An air bag for side collision is arranged substantially in the vertical direction between a vehicular inner wall and a passenger in an expanded state of the air bag. A lower side of the air bag is folded to be incorporated into the lower side in the expanded state. The lower side of the air bag in the expanded state is the upstream side of flow of expansion gas. The air bag has a narrowed gas flow port for regulating the flow of the expansion gas between the lower side and the upper side of the air bag in the expanded state so that the lower side can ensure sufficient inner pressure even when the passenger interferes with expansion of the lower side of the air bag during expansion, since the flow of the expansion gas is regulated by the gas communication port provided between the lower side and the upper side of the air bag. As a result, an inflator having small output can be used.

22 Claims, 7 Drawing Sheets

AIR BAG FOR PROTECTING PASSENGER FROM SIDE COLLISION WHICH HAS UNIFORM INFLATION CHARACTERISTICS

CROSS-REFERENCE TO RELATED APPLICATION

This application is related to and claims priority under 35 U.S.C. §119 from Japanese Patent Application Nos. Hei 9-043854 and 9-180914, incorporated herein by reference.

BACKGROUND OF THE INVENTION

1. Field of the Invention

The present invention relates to an air bag in a vehicle for protecting a passenger from a side collision. This air bag is arranged substantially in the vertical direction between a vehicular inner wall of an automobile and a passenger when the air bag is expanded.

2. Description of Related Art

Conventionally, an air bag for protecting a passenger from a side collision (hereinafter, abbreviated as side collision air bag or air bag) has been incorporated in a door panel or a seat in a folded state. The side collision air bag has been arranged between a vehicular inner wall of an automobile and a passenger when the air bag is expanded (refer to Japanese Unexamined Patent Publication Number JP-A-7-117610 and Japanese Unexamined Patent Publication Number JP-A-8-156668).

Further, when the chest area or vicinity head area of a passenger is to be protected, the side collision air bag is incorporated in a portion of a door panel or a seat rear the passenger's head in a folded state because door glass or the like is arranged rear of the head of the passenger and a folded air bag cannot be arranged there.

As a result, when expanded, the side collision air bag provides an expanded portion rear the passenger's chest and an expanded portion rear the passenger's head extended upwardly from the lower portion of the air bag. Further, the air bag is incorporated in a folded state at the lower side of an expanded state with the lower side in the expanded state as the upstream side of flow expansion gas which expands the bag.

However, according to such a side collision air bag, when the output of an inflator for supplying the expansion gas is small, the following problem occurs. When the chest of a passenger interferes with the lower side of the bag during expansion of the air bag (prior to completion of expansion), the expansion gas in the lower side of the air bag escapes to the upper side. As a result, a sufficient inner pressure cannot be ensured on the lower side of the air bag.

Accordingly, the inflator for supplying expansion gas to such a side collision air bag has a large output. Therefore, the weight of an air bag device for side collision is increased.

SUMMARY OF THE INVENTION

In view of the above problems of the prior art, it is an object of the present invention to resolve the above-described problem and to provide an air bag for side collision capable of using an inflator having a small output.

The object of the present invention can be achieved by an air bag for side collision which is arranged substantially in a vertical direction between a vehicular inner wall and a passenger in an expanded state of the air bag, a lower side of which in the expanded state forms an upstream side of a flow of an expansion gas and which is folded to be incorporated into the lower side in the expanded state. The air bag includes a narrowed gas flow port for restricting the flow of the expansion gas between the lower side and the upper side of the air bag in the expanded state.

Further, according to a further aspect of the present invention, the air bag includes a lower chamber on the lower side in the expanded state and an upper chamber on the upper side in the expanded state, where the lower chamber and the upper chamber are partitioned by a weir in which the gas flow port is arranged on a side of a front portion of a vehicle. Further, an emergency communication port which is opened to connect the lower chamber and the upper chamber only when inner pressure of the lower chamber is increased to more than a normal inner pressure value may be arranged on the rear side of the vehicle of the weir.

According to another aspect of the present invention, the air bag for side collision further includes two of a lower chamber on the upper side of the air bag in the expanded state in which the lower and upper chambers are partitioned by a weir in which the gas communication port is arranged on the rear side of the vehicle. An emergency communication port which is opened to connect the lower chamber with the upper chamber only when the inner pressure of the lower chamber is increased to a level higher than a normal inner pressure value is on the front side of the vehicle of the weir.

The narrowed gas communication port for regulating the flow of the expansion gas may be provided between the lower side and the upper side of the air bag in the expanded state. Therefore, even when the chest of a passenger interferes with the lower side during expansion prior to the completion of expansion of the air bag, the inner pressure on the lower side of the air bag can be prevented from falling because, even when the expansion gas is going to escape to the upper side, the flow of the expansion gas is regulated by the gas communication port provided between the lower side and the upper side. As a result, the inner pressure on the lower side of the air bag is prevented from falling.

Further, even when a passenger interferes with the lower side of the air bag, sufficient inner pressure can be ensured on the lower side of the air bag. Accordingly, the output of an inflator for supplying expansion gas can be reduced.

Therefore, according to the air bag for side collision of the present invention, the air bag is arranged substantially in the vertical direction when the air bag is expanded and an inflator having small output can be used with no hazard even when the air bag is folded to be incorporated in the lower side of the air bag in the expanded state with the lower side in the expanded state as the upstream side of the flow of the expansion gas. As a result, light weight formation, compact formation, reduction in cost and the like of an air bag device using the air bag for side collision can be achieved.

Further, when the air bag for side collision is formed by a lower chamber on the lower side and an upper chamber on the upper side in an expanded state of the air bag and the lower chamber and the upper chamber are partitioned by a weir at which the gas flow port is arranged on the front side of the vehicle, the following operation and effect can be achieved: when an interfering part of a passenger such as an elbow or the like interferes with the rear edge side of the air bag in the midst of expansion, the upper chamber can be expanded smoothly because the interfering part does not close the gas flow port. Accordingly, after expanding the lower chamber of the air bag, the upper chamber can be expanded smoothly.

Further, when an emergency communication port which opens to connect the lower chamber with the upper chamber only when the inner pressure of the lower chamber is increased more than a normal inner pressure value is on the rear side of the vehicle of the weir partitioning the lower chamber and the upper chamber of the air bag, the following operation and effect can be achieved: even when an interfering object arranged on the front edge side of the air bag interferes with the gas communication port and closes the gas communication port in the midst of the expansion, the upper chamber can be expanded smoothly, because the emergency communication port is opened when the inner pressure value of the lower chamber is increased to a level higher than the normal value. As a result, after expanding the lower chamber of the air bag, the upper chamber can be expanded smoothly.

Furthermore, when the air bag is formed by a lower chamber on the lower side of the air bag and an upper chamber on the upper side thereof in the expanded state of the air bag, the lower chamber and the upper chamber are partitioned by a weir by which the gas flow port is arranged on the rear side of the vehicle and an emergency communication port which opens to connect the lower chamber, the following operation and effect can be achieved: even when an interfering object arranged on the rear edge side of the air bag interferes with the gas communication port and closes the gas communication port in the midst of the expansion, the upper chamber can be expanded smoothly, because the inner pressure value of the lower chamber is increased to a level greater than the normal value and the emergency communication port is opened. As a result, after expanding the lower chamber of the air bag, the upper chamber can be expanded smoothly.

BRIEF DESCRIPTION OF THE DRAWINGS

FIG. 7 are side views showing expanded states of an air bag according to a fourth preferred embodiment in which FIGS. 8A–8D are side views showing expanded states of an air bag according to a fifth preferred embodiment in which

DETAILED DESCRIPTION OF THE PRESENTLY PREFERRED EXEMPLARY EMBODIMENTS

An explanation will be given of the present invention based on embodiments shown in the drawings as follows. Incidentally, the present invention is not limited to the embodiments, and all the modifications in the subject matter of the claims and equivalents thereof are included in the scope of claims.

Figure 1:
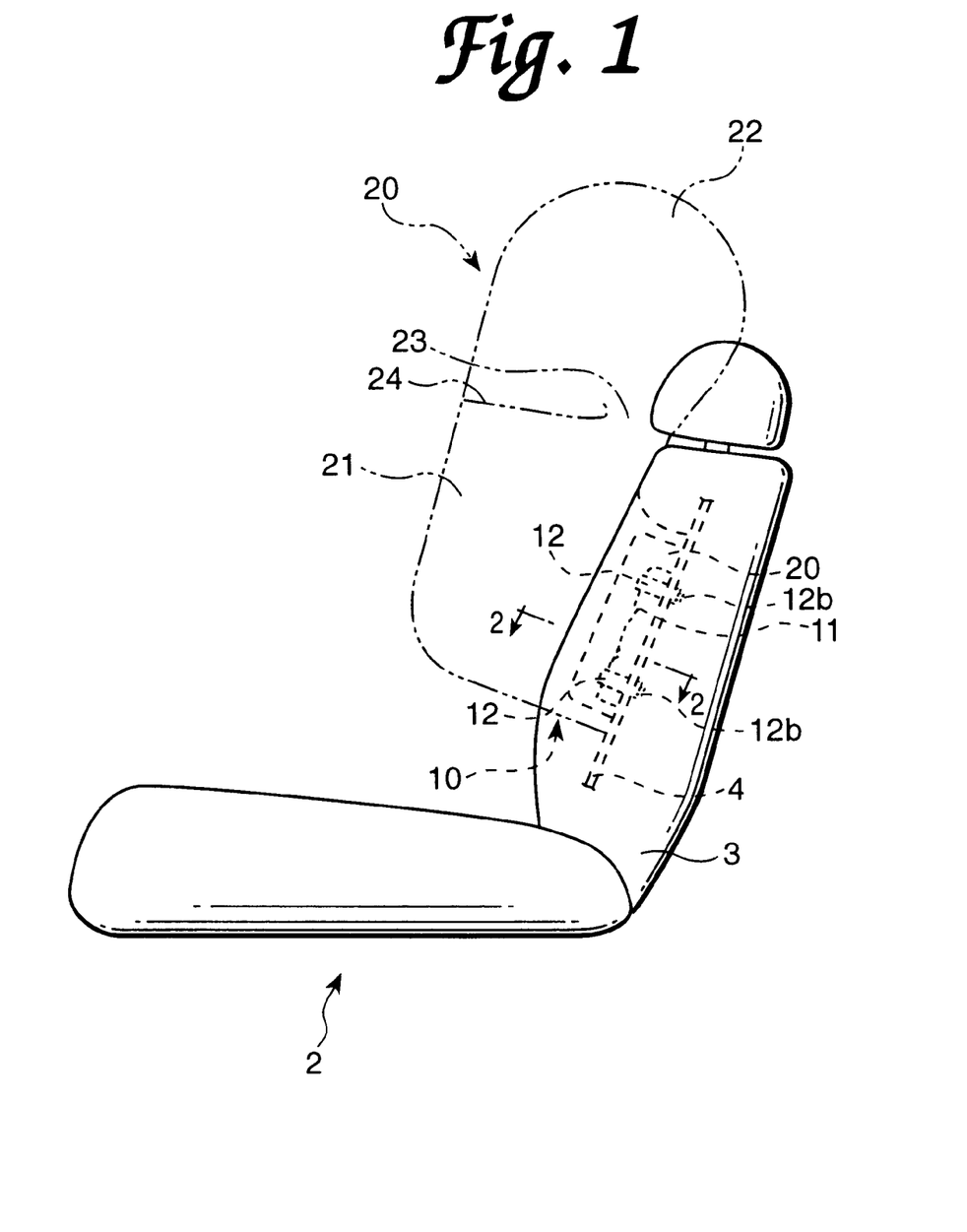
FIG. 1 is a side view showing an air bag device in which a side collision air bag according to a first preferred embodiment of the present invention is used.
Figure 2:
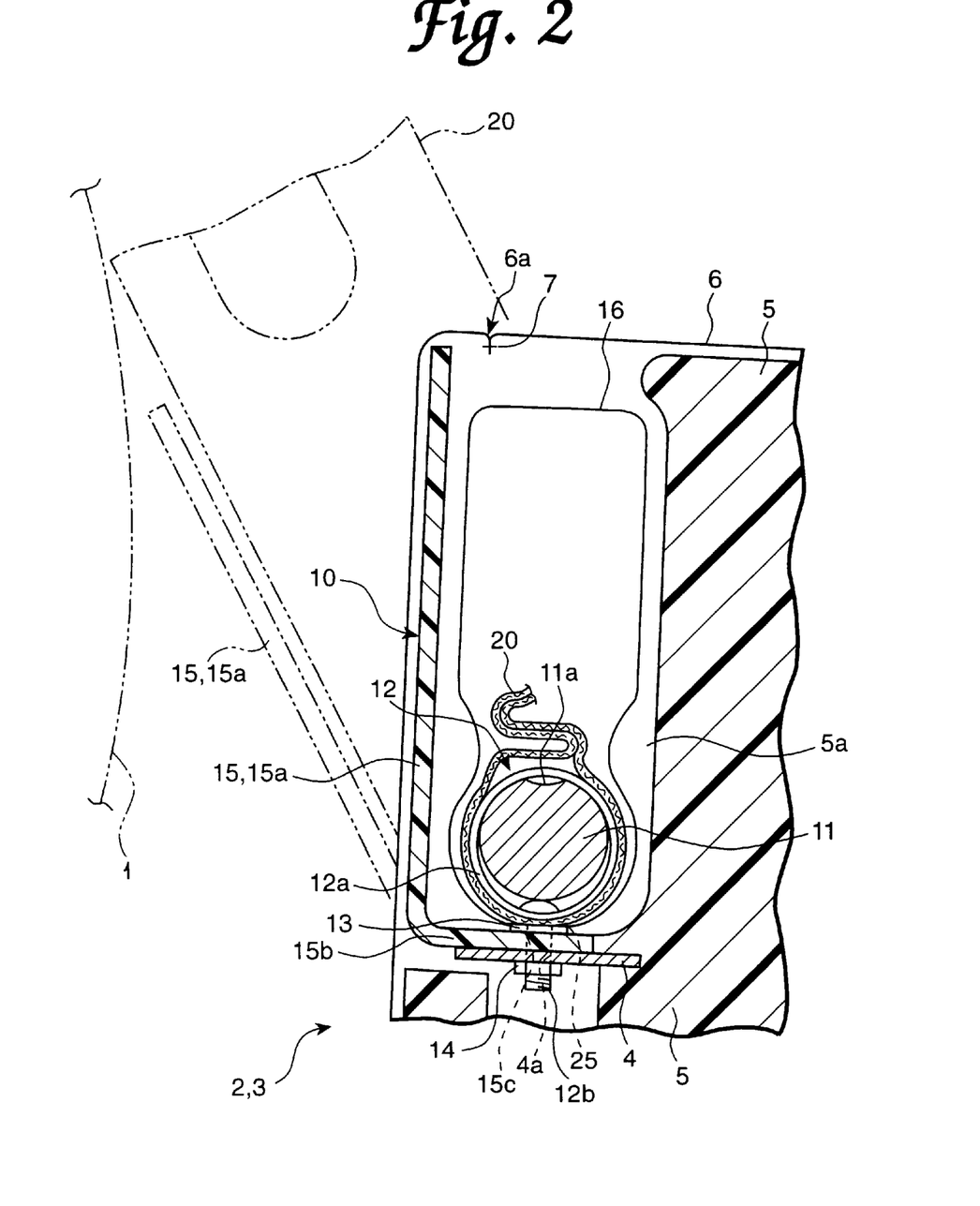
FIG. 2 is a cross-sectional view taken along a line 2—2 of FIG. 1.

As shown by FIG. 1 and FIG. 2, a side collision air body bag 20 (hereinafter referred to as "air bag") according to a first preferred embodiment of the present invention is used in an air bag device 10 for side collision. The air bag device 10 is arranged on the side of a vehicular inner wall 1 of a seat back 3 of a seat 2.

A frame 4 is arranged on the side of the vehicular inner wall 1 in the seat back 3 of the seat 2 substantially in the vertical direction. A cushion 5 on the front side of the frame 4 is provided with a recess portion 5a. The air bag device 10 is arranged inside the recess portion 5a.

Further, a covering 6 of ornamental cloth or the like is arranged on the outer periphery of the cushion 5 of the seat back 3. A seam 6a that is stitched together by a seam string 7 is formed in front of the air bag device 10. In use, the seam 6a is broken and the air bag 20 can easily be expanded.

The air bag device 10 is constituted provides the air bag 20 and an inflator 11 for expanding the air bag 20.

The inflator 11 is of a cylinder type. The inflator 11 is arranged inside the air bag by being wrapped by the air bag 20. The inflator 11 is provided with a gas injection port 11a for injecting expansion gas at a predetermined position. The output (injection amount of expansion gas) of the inflator 11 is 30% smaller than that of a conventional inflator.

Further, the inflator 11 is fixed with two attaching brackets 12. Each of the attaching brackets 12 provides a cylinder portion 12a made of sheet metal and a bolt 12b projecting from the cylinder portion 12a. When the attaching brackets 12 are attached to the inflator 11, firstly, the cylindrical portions 12a are mounted on the inflator 11. Next, the brackets 12 are attached to the inflator 11 by partially and plastically deforming the cylinder portion 12a to narrow the inner diameter of the cylinder portion 12a.

Further, the inflator 11 along with the folded air bag 20 is attached to the seat back 3 by the respective attaching brackets 12. That is, the bolts 12b project from the air bag 20 and penetrate attaching holes 15c of an attaching base 15b of a cover 15 and attaching holes 4a of the frame 4. Then, by fastening nuts 14 to the bolts 12b, the inflator 11 along with the folded air bag 20 is attached to the seat back 3. Therefore, the attaching brackets 12 serve to attach the air bag device 10 to the seat back 3.

Further, a cover 15 is made of synthetic resin and protects the air bag device 10. The cover 15 covers side portions of the folded air bag 20 and the inflator 11 on the side of the vehicular inner wall 1. The cover 15 provides a main body 15a in a rectangular plate shape and the attaching base 15b. The attaching base 15b is bent from the rear end of the main body 15a. The attaching base 15b is provided with the attaching holes 15c for receiving the bolts 12b of the respective attaching brackets 12.

The air bag 20 is provided with a bag shape extending substantially in the vertical direction and having a lower chamber 21 and an upper chamber 22 as an expanded shape as shown by two-dotted chain lines in FIG. 1. A weir 24 (corresponding to the restriction means recited in the appended claims) is formed between the lower chamber 21 and the upper chamber 22. The weir 24 is formed to narrow a gas flow port 23 connecting the chambers 21 and 22 to one another. The weir 24 is formed by stitching together opposed portions of base cloth 30 constituting the air bag 20 using seam string 32 (refer to FIGS. 3A–3D) according to the embodiment. Further, an end portion of the weir 24 on the side of the gas flow port 23 is seamed to bend in a circular arc shape toward the side of the upper chamber 22. The reason of stitching the bag in such a way is that a stress concentration is prevented from forming at the end portion of the weir 24 on the side of the gas flow port 23. Incidentally, other than utilizing the seam string 32, the weir 24 may be formed by adhering the opposed cloth 30.

Figure 3A:
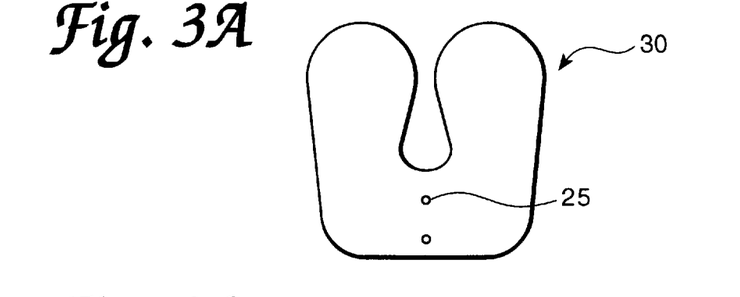
FIGS. 3A–3F show fabrication steps of the air bag according to the embodiment.

Next, an explanation will be given of fabrication of the air bag 20. First, as shown in FIG. 3A, the base cloth 30 is cut in a predetermined shape and attaching holes 25 for inserting the bolts 12b of the respective attaching brackets 12 are provided. The base cloth 30 is woven cloth of polyester, polyamide or the like.

Figure 3B:
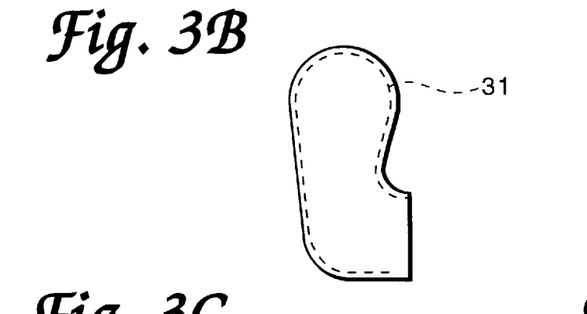

Next, as shown in FIG. 3B, the base cloth 30 is folded in two at the center and the outer peripheral edge is stitched together by seam string 31. Incidentally, in the stitching operation of the seam string 31, a portion of the peripheral edge is left unsewn in order to insert the inflator 11.

Figure 3C:
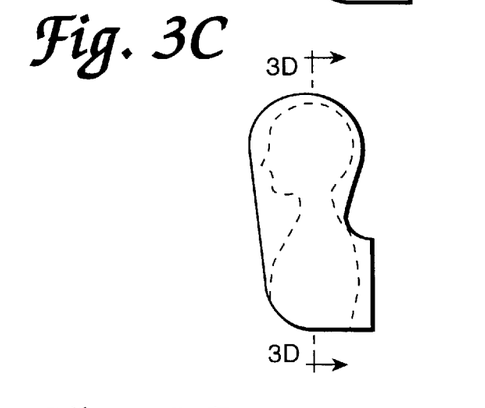
Figure 3D:
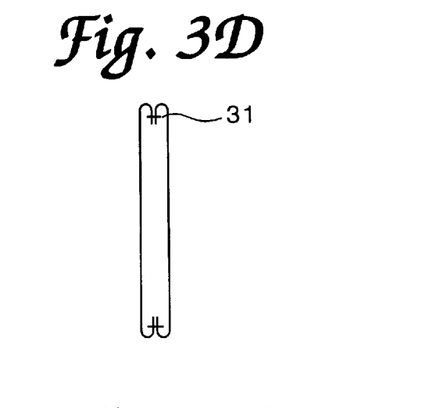

Thereafter, as shown in FIGS. 3C–3D, the inside of the base cloth 30 is turned out using an opening at the unsewn portion. Thereby, the seam portion of the outer peripheral edge of the base cloth 30 is arranged on the side of the inner peripheral face of the air bag 20. Incidentally, when the seamed portion is exposed on the surface side, the inside of the base cloth need not be turned out. Further, the seamed portion may not be placed on the surface side only at the outer peripheral edge on the side of the upper chamber 22. That is, only the outer peripheral edge on the side of the upper chamber 22 is stitched together and the inside is turned out. Thereafter, the remaining outer peripheral edge may be stitched together.

Figure 3E:
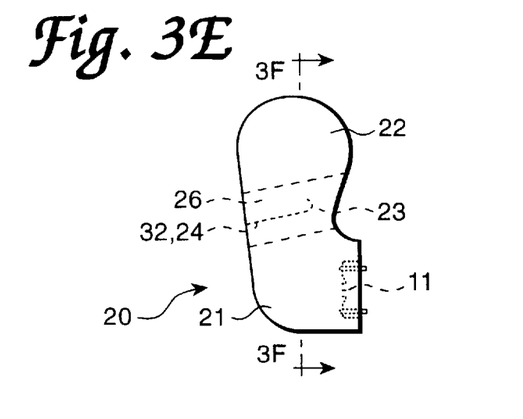
Figure 3F:
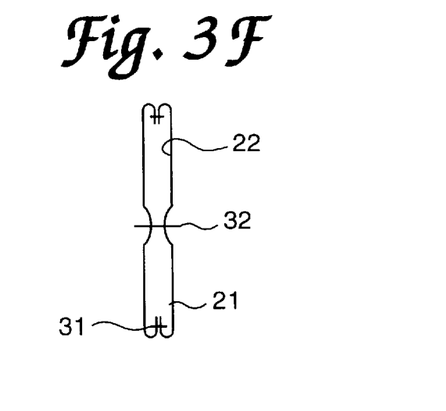

Further, after turning the inside out as shown in FIGS. 3C and 3D, opposed base cloth 30 at an intermediate portion in the vertical direction is stitched together by the seam string 32 by which the weir 24 is provided as shown in FIGS. 3D and 3E. Further, the inflator 11 attached with the attaching brackets 12 is inserted into the inner portion. Successively, when the unnecessary opening portion is stitched together by the seam string 31, the air bag 20 can be fabricated.

Further, when the inflator 11 is inserted into the air bag 20, the bolts 12b project from the attaching holes 25.

Further, string made of polyamide or polyester such as 66 nylon or the like may be used for the seam strings 31 and 32. Further, reinforced cloth 26 may be arranged on the side of the inner peripheral face of the air bag 20 to enhance the strength of the portion stitched by the seam string 32. Incidentally, according to the embodiment, 66 nylon string of 1680 denier is used for the seam strings 31 and 32.

Figure 4A:
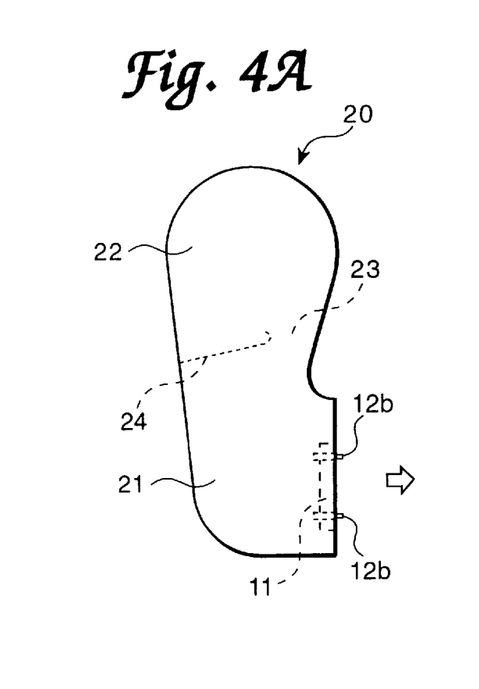
FIGS. 4A–4F show steps of folding the air bag according to the embodiment.
Figure 4B:
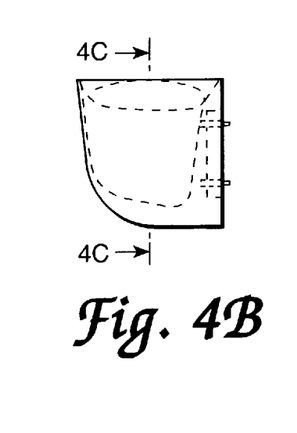
Figure 4C:
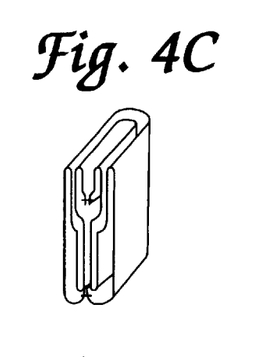

Next, an explanation will be given of the way of folding the air bag 20. First, the air bag 20 is brought from a state shown in FIG. 4A into a state shown in FIGS. 4B and 4C. That is, the upper chamber 22 is put into the inner side of the lower chamber 21 and the upper side of the upper chamber 22 is then put into the side of the lower chamber whereby cactus folding is effected.

Figure 4D:
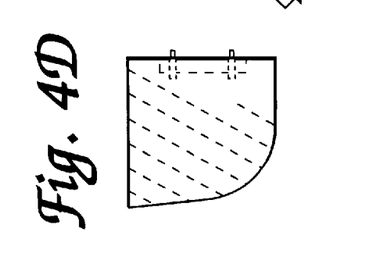
Figure 4E:
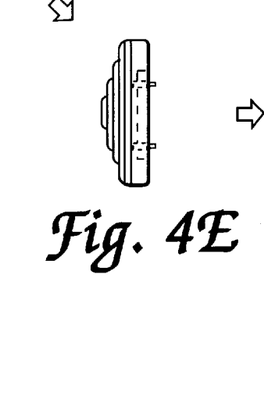

Next, as shown in FIGS. 4D and 4E, positions shown by broken lines are creased and a base cloth 20 is folded in below folding toward the side of the inflator 11.

Figure 4F:
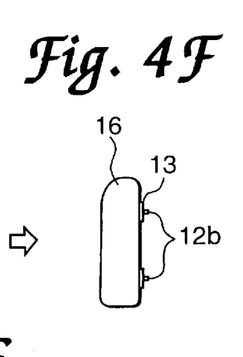

Thereafter, as shown in FIG. 4F, the folded cloth is covered with a film 16 formed by thermally contracting polyester or the like that is easy to break. The film 16 is provided in order to prevent the air bag 20 from accidentally unfolding. Incidentally, on this occasion, the respective bolts 12b are left projecting. Further, spring washers 13 are fitted to the respective bolts 12b to prevent the respective bolts 12b from detaching from the attaching holes 25.

Further, the folded air bag 20 is arranged at a predetermined position of the frame 4 along with the cover 15. Next, the respective bolts 12b are inserted through attaching holes 15c and 4a and the nuts 14 are fastened to the respective bolts 12b. Thereby, the air bag device 10 can be attached to the frame 4. The covering 6 is stitched together at surrounding of the cushion 5 and the seat 2 is arranged in a vehicle. Thereby, the air bag device 10 can be mounted on the vehicle.

Thereafter, when expansion gas is injected from the gas injection port 11a of the inflator 11, the air bag 20 is expanded as shown by the two-dotted chain lines of FIG. 2. That is, first, the lower chamber 21 of the air bag 20 starts expanding and breaks the film 16 and breaks the seam 6a. The lower chamber 21 is projected forward between the vehicular inner wall 1 and a passenger to open the main body 15a of the cover 15. Then, the upper chamber 22 is projected upward from the lower chamber 21.

Further, by supplying expansion gas from the inflator 11, as shown by the two-dotted chain lines of FIG. 2, the lower chamber 21 and the upper chamber 22 are expanded into an expansion completion shape.

Further, according to the air bag 20 of the first embodiment, when the chest of a passenger interferes with the lower chamber 21 in the midst of expanding the air bag prior to completion of the expansion, the flow of the expansion gas is regulated by the gas flow port 23 provided between the lower chamber 21 and the upper chamber 22. Therefore, even when the expansion gas is going to escape into the upper chamber 22, the flow of the expansion gas is regulated by the gas flow port 23 and the inner pressure of the lower chamber 21 of the air bag 20 is prevented from falling.

That is, even if a passenger interferes with the lower chamber 21 of the air bag 20 in lie midst of expansion, sufficient inner pressure can be ensured in the lower chamber 21 of the air bag 20. Accordingly, the output of the inflator 11 for supplying the expansion gas can be decreased.

Therefore, not only is the air bag arranged substantially in the vertical direction when the air bag is expanded, but even when the lower side of the air bag (i.e., the side of the lower chamber 21) in the expanded state is the upstream side of the flow of the expansion gas, and the air bag is folded and incorporated on the lower side of the air bag (i.e., side of the lower chamber 21) in the expanded state, an inflator 11 having a small output can be used with no hazard. As a result, light weight formation, compact formation, reduction in cost and the like of the air bag device 10 using the side collision air bag 29 can be achieved.

Further, according to the air bag 20 of the embodiment, the gas flow port 23 is provided on the side of the inflator 11. However, the weir may be provided such that the gas flow port 23 is at a side remote from the inflator 11 as in an air bag 40 shown in FIG. 5. The weir 44 in this second embodiment is formed by stitching together the base cloth using the seam string 32. Or, two weirs 54 separated from each other may be formed and the gas flow port 23 may be provided at a center of the weirs 54 as in an air bag 50 according to a third embodiment of the invention shown in FIG. 6. The weirs 54 are formed by stitching together the base cloth using the seam string 32. Further, three or more weirs may be provided as long as the flow of the expansion gas can be regulated.

Further, the gas flow port 23 is provided by forming the weir 24, 44 or 54 by stitching together opposed portions of the base cloth 30. However, the gas flow port 23 may be formed as follows. First, the base cloth 30 is cut so the base cloth 30 is recessed at the boundary between the lower chamber 21 and the upper chamber 22. Further, only the outer peripheral edge of the base cloth 30 need be stitched together by the seam string 31 without stitching together the base cloth by the seam string 32. In this case, the recessed portion of the base cloth 30 constitutes the gas flow port 23 connecting the lower chamber 21 with the upper chamber 22 and narrowing the opening area. However, compared with such a constitution, it is preferable to provide the gas flow port 23 by stitching together the base cloth because the shape holding performance of the air bag after completion of expansion is achieved more excellently.

Figure 5:
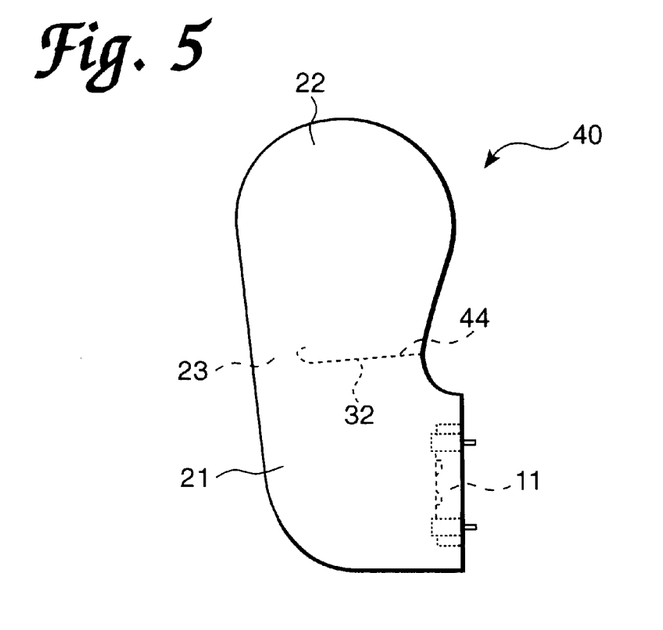
FIG. 5 is a front view of an air bag according to a second preferred embodiment of the present invention when the air bag is expanded.
Figure 6:
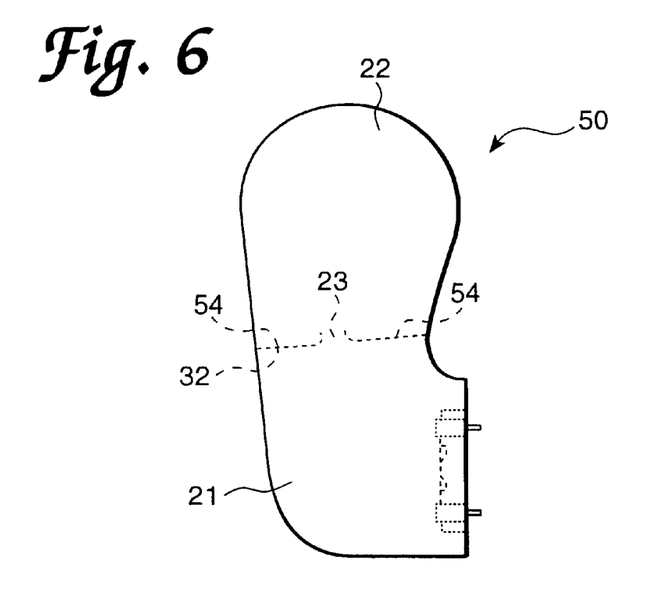
FIG. 6 is a front view of an air bag according to a third preferred embodiment of the present invention when the air bag is expanded.
Figure 7A:
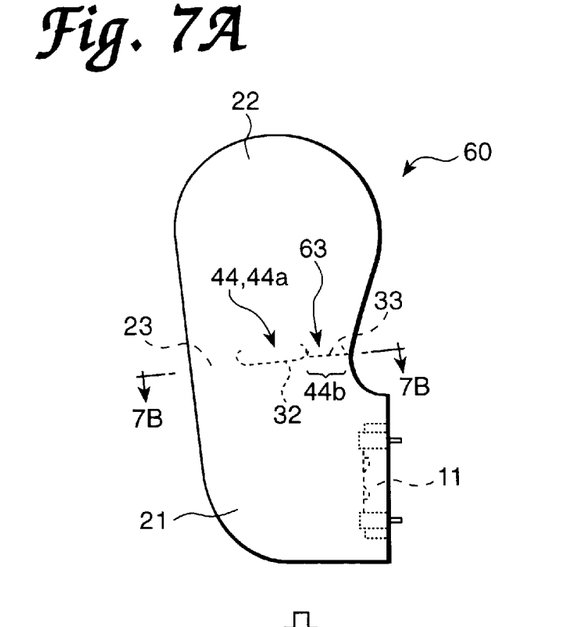
FIG. 7A is a front view showing an expanded state of the air bag when the air bag does not interfere with an interfering object.
Figure 7B:
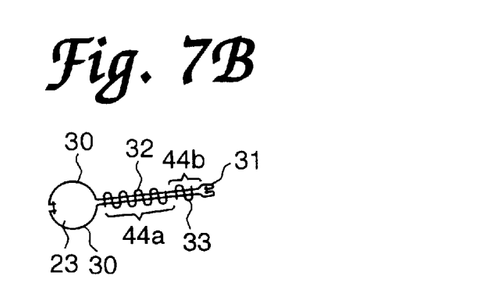
FIG. 7B is a cross-sectional view thereof.
Figure 7C:
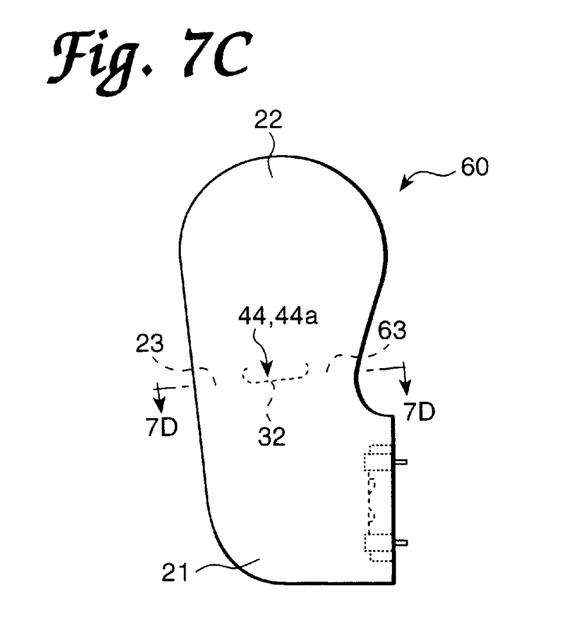
FIG. 7C is a front view showing an expanded state of the air bag when an interfering object is arranged on the front edge side of the air bag.
Figure 7D:
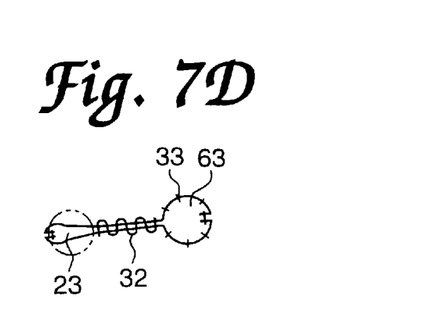
FIG. 7D is a cross-section view thereof.
Figure 8A:
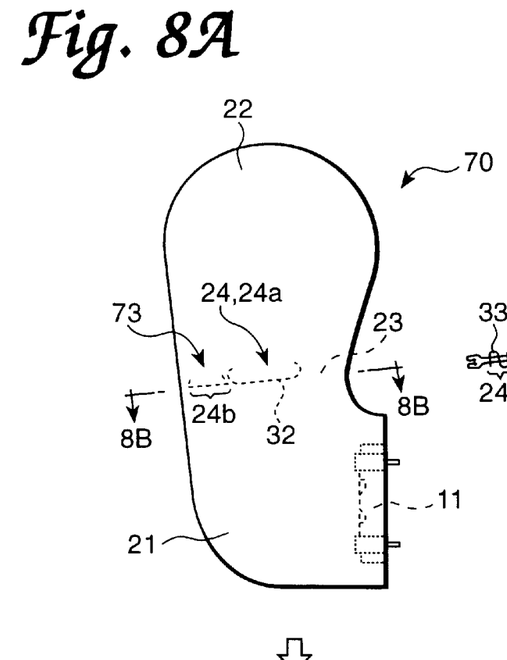
FIG. 8A is a front view showing an expanded state of the air bag when the air bag does not interfere with an interfering object.
Figure 8B:
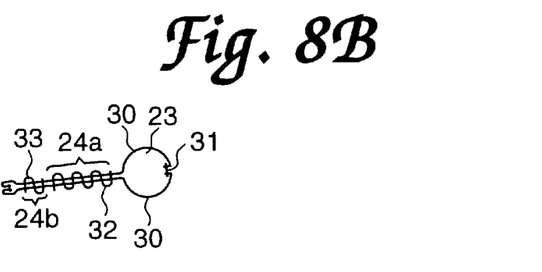
FIG. 8B is a cross-sectional view thereof.
Figure 8C:
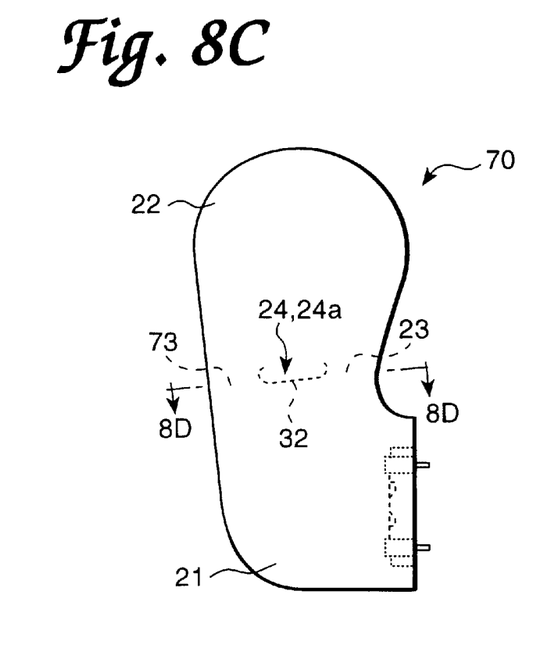
FIG. 8C is a front view showing an expanded state of the air bag when an interfering object is arranged on the rear edge side of the air bag.
Figure 8D:
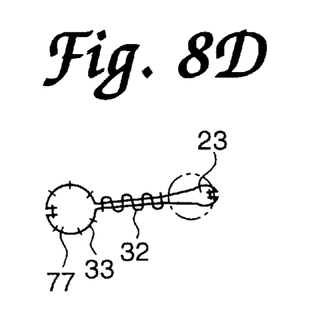
FIG. 8D is a cross-sectional view thereof.

Furthermore, according to the air bag 20 shown in FIG. 5, the air bag 20 is constituted by the lower chamber 21 on the lower side and the upper chamber 22 on the upper side in the folded state when the lower chamber 21 and the upper chamber 22 are partitioned by the weir 44. The weir 44 is formed to arrange the gas flow port 23 on the side of the front portion of the vehicle. Therefore, according to the air bag 20 shown by FIG. 5, even when an interfering part of a passenger such as an elbow or the like interferes with the rear edge side of the air bag 20 in the midst of expansion, the gas flow port 23 is not closed. As a result, even when an interfering part of a passenger such as an elbow or the like interferes with the rear edge side of the air bag 20, after expanding the lower chamber 21 of the air bag 20, the upper chamber 22 can be expanded smoothly.

Further, an air bag 60 according to a fourth preferred embodiment as shown in FIGS. 7A–7D may be constituted as an improvement of the air bag 20. The air bag 60 is provided with an emergency communication port 63 (corresponding to the overpressure relief means recited in the appended claims) on the side of the rear portion of the vehicle in the weir 44 partitioning the lower chamber 21 and the upper chamber 22. The air bag 60 opens the emergency communication port 63 only when the inner pressure of the lower chamber 21 increases to more than a normal inner pressure value. A fragile portion 44b provided on the side of the rear portion of the vehicle in the weir 44 closes a communication port 63. Due to the fragile portion 44b, the bonding strength between the opposed base cloth 30 weaker than that of a main body portion 44a on the side of the front portion of the vehicle in the weir 44. In the case of the embodiment, the fragile portion 44b is formed by stitching together the opposed base cloth 30 using seam string 33. The tensile strength of the seam string 33 is weaker than that of the seam string 32 that is used in the weir main body 44a. Naturally, the bonding strength of the base cloth 30 at the fragile portion 44b is set to a strength by which the communication port 63 is not opened at an inner pressure value of the lower chamber 21 when the air bag 60 is expanded normally. Preferably, in the case of this embodiment, 66 nylon string of 200 through 450 denier is used for the seam string 33.

According to such an air bag 60, even when an interfering object arranged on the front edge side of the air bag 60 interferes with the gas flow port 23 in the midst of expansion, the upper chamber 22 can smoothly be expanded. That is, even when the gas flow port 23 is closed by the interfering object, the inner pressure value of the lower chamber 21 is increased significantly compared with the normal inner pressure value. Therefore, the seam string 33 is broken and the emergency communication port 63 is opened. Then, after expanding the lower chamber 21 of the air bag 60, the upper chamber 22 can smoothly be expanded.

Furthermore, an air bag 70 according to a fifth embodiment shown in FIGS. 8A–8D may be constituted. The air bag 70 is constituted by the lower chamber 21 on the lower side and the upper chamber 22 on the upper side in the expanded state. The lower chamber 21 and the upper chamber 22 are partitioned by the weir 24 at which the gas flow port 23 is arranged on the side of the rear portion of the vehicle. An emergency communication port 73 capable of connecting the lower chamber 21 and the upper chamber 22 is provided on the side of the front portion of the vehicle in the weir 24. According to the air bag 70, the emergency communication port 73 is opened only when the inner pressure of the lower chamber 21 is increased to more than the normal inner pressure value.

The air bag 70 is also provided with a fragile portion 24b for closing the communication port 73 on the side of the front portion of the vehicle of the weir 24 as in the air bag 60. Due to the fragile portion 24b, the bonding strength between the opposed base cloth 30 is weakened compared with that of a main body portion 24a on the side of the rear portion of the vehicle of the weir 24. In the case of the embodiment, the fragile portion 24b is formed by stitching together the opposed base cloth 30 using the seam string 33. The tensile strength of the seam string 33 is weak compared with that of the seam string 32 used in the weir main body 24a. Naturally, the bonding strength of the base cloth 30 at the fragile portion 24b is set to a strength at which the communication port 73 is not opened by an inner pressure value of the lower chamber 21 when the air bag 70 is normally expanded.

According to such an air bag 70, even when an interfering object arranged on the rear edge side of the air bag 70 interferes with the gas communication port 23 and the gas communication port 23 is closed in the midst of expansion, the upper chamber 22 can be expanded smoothly. That is, when the interfering object closes the gas flow port 23, the inner pressure value of the lower chamber 21 is increased to a level significantly greater than the normal inner pressure value, the seam string 33 is broken and the emergency communication port 73 is opened. Accordingly, after expanding the lower chamber 21 of the air bag 70, the upper chamber 22 can be expanded smoothly.

Further, when the fragile portion 24b or 44b is formed by stitching together the base cloth by the seam string 33 as in the air bag 60 or 70, it is necessary to make the seam string 33 easier to break than the seam string 32. In such a case, the diameter of the seam string 33 of the fragile portion 24b or 44b may be thinned or the seam pitch of the seam string 33 may be widened. Alternatively, an abruptly bent portion such as a sharp edge may be provided at seam at the fragile portion as in the illustrated example. Further, the fragile portion 234b or 44b may be provided by stitching together the base cloth in a zigzag seam such that stress concentration is likely to occur.

Further, in providing the fragile portion 24b or 44b at the weir 24 or 44, the opposed base cloth 30 may be bonded separably. For that purpose, other than utilizing the seam string 33, the fragile portion 24b or 44b for closing the communication port 63 or 73 may be formed by bonding together the base cloth 30 using glue.

Further, the opening area of the emergency communication port 63 or 73 is preferably set to an opening area substantially the same as that of the gas flow port 23. The reason is that the inner pressure on the side of the lower chamber 21 is restrained from lowering when the air bags 20, 40, 50, 60 and 70 are in the seat 2. However, the bags may be in a door panel.

What is claimed is:

1. An air bag for side collision being arranged substantially in a vertical direction between a vehicular inner wall and a passenger in an expanded state of said air bag, a lower side of which in said expanded state constitutes an upstream side of a flow of an expansion gas and which can be folded into said lower side, said air bag comprising:

a narrowed gas flow port for restricting flow of the expansion gas between said lower side and an upper side of said air bag in the expanded state;

a lower chamber on said lower side of said air bag in said expanded state.

an upper chamber said the upper side of said air bag in said expanded state, wherein said lower chamber and said upper chamber are partitioned by a weir in which said gas flow port is arranged on a side of a front portion of a vehicle; and an emergency communication port in said weir on a side of a rear portion of the vehicle, wherein said emergency communication port opens to connect said lower chamber with said upper chamber only when an inner pressure of said lower chamber increases to a level higher than a normal inner pressure value.

2. The air bag for side collision according to claim 1, wherein the weir is opposed portions of a base cloth for forming the air bag which are stitched together.

3. The air bag for side collision according to claim 2, wherein an end portion of the weir bends in a circular arc shape when expanded.

4. The air bag for side collision according to claim 1, further comprising:

a fragile portion formed by stitching together opposed portions of a base cloth forming said air bag and arranged on said side of said rear portion of the vehicle of said weir, wherein said fragile portion closes said emergency communication port.

5. The air bag for side collision according to claim 4, wherein an end portion of said fragile portion, which is formed by stitching together said base cloth, can be abruptly bent.

6. An air bag for side collision being arranged substantially in a vertical direction between a vehicular inner wall and a passenger in an expanded state of the air bag, a lower side of which in said expanded state constitutes an upstream side of a flow of an expansion gas and which can be folded into said lower side, said air bag comprising a narrowed gas flow port for restricting said flow of the expansion gas between said lower side and an upper side of said air bag in said expanded state;

a lower chamber on a side of a lower portion of said air bag in said expanded state of said air bag;

an upper chamber on a side of an upper portion of said air bag in said expanded state, wherein said lower chamber and said upper chamber are partitioned by a weir in which said gas flow port is arranged on a side of a rear portion of a vehicle; and an emergency communication port on a side of a front portion of said vehicle of said weir, wherein said emergency communication port opens such that said lower chamber is connected to said upper chamber only when an inner pressure of said lower chamber increases to a level higher than a normal inner pressure value.

7. The air bag for side collision according to claim 6, further comprising:

a fragile portion formed by stitching together opposed portions of a base cloth forming said air bag and arranged on a side of a front end of the vehicle, wherein said fragile portion closes said emergency communication port.

8. The air bag for side collision according to claim 7, wherein an end portion of the seamed fragile portion can bend abruptly.

9. An air bag for protecting a passenger from a side collision, said air bag comprising:

an air bag body having an inflation inlet; and a restriction means, disposed in said air bag body and defining a first chamber on a side of said air bag body proximate to said inflation inlet and a second chamber on a side of said air bag body opposite said inflation inlet, for restricting flow of gas from said first chamber to said second chamber, wherein said restriction means is a weir, said weir including an overpressure relief means for providing an additional port connecting said first and second chambers responsive to an overpressure condition in said air bag body, whereby even when gas is provided through said inflation inlet and inflation of said first chamber is interfered with, flow of gas into said second chamber is restricted to ensure inflation of said first chamber.

10. The air bag according to claim 9, wherein said weir and said air bag body collectively define a gas flow port connecting said first and second chambers.

11. The air bag according to claim 10, wherein said gas flow port is on a side of said air bag proximate to said inflation inlet.

12. The air bag according to claim 10, wherein said gas flow port is on a side of said air bag opposite said inflation inlet.

13. The air bag according to claim 10, wherein said gas flow port is in a substantially central portion of said air bag body.

14. The air bag according to claim 10, further comprising an additional port, said ports being on opposite sides of said air bag body.

15. The air bag body according to claim 9, wherein said overpressure relief means is an area of said weir weaker than an adjacent portion of said weir, said area of said weir rupturing when pressure in said first chamber is higher than a nominal inflation pressure of said air bag.

16. An air bag for protecting a passenger from a side collision, said air bag comprising:

an air bag body having an inflation inlet; and a restrictor, disposed in said air bag body and defining a first chamber on a side of said air bag body proximate to said inflation inlet and a second chamber on a side of said air bag body opposite said inflation inlet, for restricting flow of gas from said first chamber to said second chamber, wherein said restrictor is a weir, said weir including an overpressure reliever for providing an additional port connecting said first and second chambers responsive to an overpressure condition in said air bag body, whereby even when gas is provided through said inflation inlet and inflation of said first chamber is interfered with, flow of gas into said second chamber is restricted to ensure inflation of said first chamber.

17. The air bag according to claim 16, wherein said weir and said air bag body collectively define a gas flow port connecting said first and second chambers.

18. The air bag according to claim 17, wherein said gas flow port is on a side of said air bag proximate to said inflation inlet.

19. The air bag according to claim 17, wherein said gas flow port is on a side said air bag opposite said inflation inlet.

20. The air bag according to claim 17, wherein said gas flow port is in a substantially central portion of said air bag body.

21. The air bag according to claim 17, further comprising:

an additional port, said ports being on opposite sides of said air bag body.

22. The air bag body according to claim 16, wherein said overpressure reliever is an area of said weir weaker than an adjacent portion of said weir, said area of said weir rupturing when pressure in said first chamber is higher than a nominal inflation pressure of said air bag.

* * * * *